May 4, 1965 W. C. RUBINSTEIN 3,182,121
SUBSCRIPTION-TELEVISION RECEIVER HAVING
RATE SET BY PROGRAM SELECTOR
Filed June 22, 1961

INVENTOR.
WILLIAM C. RUBINSTEIN
BY Lyon & Lyon
ATTORNEYS 3,182,121

SUBSCRIPTION-TELEVISION RECEIVER HAVING RATE SET BY PROGRAM SELECTOR

William C. Rubinstein, Van Nuys, Los Angeles, Calif., assignor to Paramount Picture Corporation, New York, N.Y., a corporation of New York Filed June 22, 1961, Ser. No. 118,857
8 Claims. (Cl. 178—5.1)

This invention relates to subscription-television systems and, more particularly, to improvements in establishing the cost of a subscription-television program at a subscriber's receiver.

In subscription-television systems of the type which desire to indicate to a subscriber the cost of viewing a television program, and thereafter affording the subscriber some way of paying therefor, a number of different system have been proposed. One system is to have apparatus at the receiver which responds to signals transmitted from the transmitter in order to indicate the price of the program. Payment therefor can then be made. Other systems which have been proposed require the subscriber to turn certain dials to certain code numbers which, if not done properly, causes the received picture to be unintelligible. Proper setting up of these numbers by turning the dials also establishes a proper price in coin-collecting equipment.

These arrangements all have the common defect that complex apparatus is required at the receiver for establishing the price, whether by way of responding to signals from the transmitter or by way of insuring that the program remains unintelligible until the subscriber has made the proper adjustments. Since it is expected that a large number of subscribers will participate in a subscription-television system, and since each subscriber receiver will require coin-pricing and coin-collecting equipment, it will be appreciated that any savings in the cost of this equipment is extremely important.

An object of this invention is the provision of apparatus for use in pricing a subscription-television program which is simpler than those proposed heretofore.

Another object of this invention is the provision of an arrangement for indicating the price of a subscription-television program at a receiver which is less expensive than those proposed heretofore.

Yet another object of the present invention is the provision of a novel and useful system for indicating at a subscription-television receiver the cost for viewing a subscription-television program.

These and other objects of the invention may be achieved in a subscription-television system by providing a plurality of subscription-television transmission channels between a transmitter and subscriber receiver whereby the price of a subscription-television program may be established. Each transmission channel may constitute a separate wire connected between a transmitter and subscription-television receivers or a separate carrier frequency. Each transmission channel will have associated therewith a different price. At each subscriber's receiver there is provided an arrangement which may constitute an attachment for the receiver. This attachment will contain means for tuning or selecting one of the plurality of transmission channels. At the transmitter, the subscription-television program is transmitted over the one of the channels which represents the price desired to be paid. At the receiver, operation of the selecting or tuning means actuates a pricing mechanism which indicates the price in accordance with the channel which is selected. A means is provided for receiving coins and operating the price-indicating means in accordance with the value of the coin received until it reaches the paid-up position where a means such as a switch is closed, which enables the subscriber receiver to receive and/or reproduce the program which has been selected, which program has been withheld until this time. At the end of the program, means is provided for resetting the price-indicating means. Means is also provided for resetting the price-indicating means in the event an attempt is made to turn away from the selected channel to another channel, once the price has been paid.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
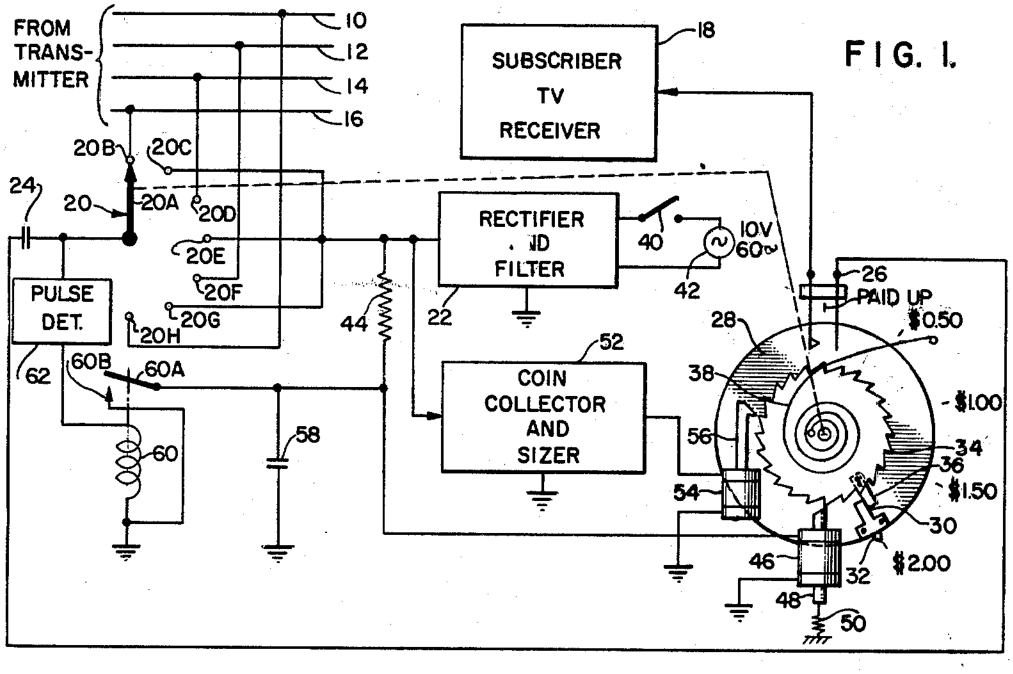
FIGURE 1 is a block diagram of an embodiment of the invention.

Reference is now made to FIGURE 1 of the drawings, which is a block diagram of an embodiment of the invention. A plurality of transmission channels are employed, comprising in the embodiment of the invention shown in FIGURE 1 a plurality of lines 10, 12, 14, 16, which extend from a transmitter to a subscriber receiver. Each one of these lines is associated with a price which must be paid for viewing a television program transmitted over that line. At the transmitter, selection of the one of the lines over which a program is to be transmitted is made in accordance with the price desired to be charged therefor. Thus, assume that line 16 has associated therewith a $2.00 price, line 14 has associated therewith a $1.50 price, line 12 has associated therewith a $1.00 price, and line 10 has associated therewith a $.50 price. At the transmitter, a single program may be sent out on one of the transmission channels in accordance with the price to be charged therefor, or programs may be sent out on each one of the transmission channels simultaneously, thus giving subscribers not only a choice of program material, but also of the price.

At each receiver 18 of a subscriber, there is provided pricing apparatus which includes a selector switch 20, having a selector arm 20A and a plurality of selector terminals, respectively 20B, 20C, 20D, 20E 20F, 20G, and 20H. The selector terminals 20B, 20D, 20F, and 20H are respectively connected to the lines 16, 14, 12, and 10. The remaining selector terminals are connected together and to the output of a rectifier and filter circuit 22. The selector arm 20A is connected through a coupling capacitor 24 and through a normally open switch 26 to the input to the subscriber television receiver 18.

Figure 3:
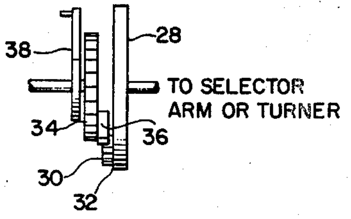
FIGURE 3 is a drawing of a detail of the pricing equipment.

The selector arm 20A may be mechanically coupled to a rotatably supported wheel 28, so that operation of the selector arm rotates the wheel 28. The wheel 28 has a stop member 30 mounted thereon and rotatable therewith. The stop member 30 carries a pointer 32. Attention is directed to FIGURE 3, which is a detailed drawing illustrating the arrangement of the wheel 28 and a ratchet gear 34, which is also rotatably mounted adjacent to the wheel 28, and also carries a member 36 on the side closest to the wheel 28. The member 36 extends sufficiently so that it can be engaged by the stop member 30. As a result, movement of the selector arm 20 in one direction (the decreasing price direction) will rotate the wheel 28 and, by reason of the engagement of the members 32 and 36, will rotate the gear 34 therewith. A spring 38 biases the position of the gear 34 so that the member 36 will be biased against the member 30.

It will be seen from the foregoing description that operation of the selector arm 20A to select a channel simultaneously actuates the wheel 28 and gear 34 to indicate the price for viewing the program which is being transmitted over that channel, but which is being withheld from the subscriber's receiver until such time as payment for the program has been made. The subscriber can obtain information as to the program which are being altered, either from the newspapers, or through the mail, or through any other suitable arrangement for conveying this information. If the subscriber desires to purchase a program, he first selects the channel carrying that program; he then operates a switch 40, which applies power from a source 42 to a rectifier and filter 22. Direct-current output voltage of the rectifier and filter circuit 22 is applied to all of the selector terminals 20C, 20E, and 20G, and also through a resistor 44 to a solenoid 46. The armature 48 of the solenoid 46 is spring-biased by a spring 50, to be held away from the ratchet wheel 34. However, when the solenoid 46 is excited by current from the rectifier and filter 22, it moves the armature 48 into engagement with the gear of ratchet wheel 34. By virture of the shaping of the portion of the armature 48 which engages the gear of ratchet wheel 34, the gear is held in a manner so that it may be rotated unidirectionally—that is, in the direction of decreasing price only. Rotation in the opposite direction is prevented.

The apparatus at a subscriber's receiver also includes a suitable arrangement for collecting coins. This is designated by the rectangle labeled, coin collector and sizer 52. This apparatus comprises any well-known structure into which coins may be deposited and which emit electrical pulses in a number dependent upon the size of the coin which has been deposited. Thus, since the arrangement comprising the wheel 28 and gear 34 have been rotated to indicate a price for the program, the subscriber deposits coins in the coin collector and sizer. The output, consisting of a number of pulses in accordance with the value of the coin deposited, is applied to a solenoid 54. This solenoid actuates an armature 56, responsive to each pulse. The armature 56 has a hook-shaped end and, when moved by the solenoid 54, turns the gear 34 in the direction of decreasing the price. The amount by which the gear is turned depends upon the value of the coin which has been deposited. Accordingly, deposit of coins continues until such time as the gear 34 reaches the paid-up position. At that time, it closes the switch 26, whereby the subscriber may receive the program which is being transmitted.

The resistor 44, besides being connected to the solenoid 46, is also connected to a capacitor 58, the other side of which is connected to ground. A relay 60 has a pair of normally open contacts 60A, 60B. The contact 60A is connected to resistor 44 to the rectifier and filter 22. The contact 60B is connected to ground. The relay coil is connected to ground at one end and at the other end to a pulse detector 62. At the end of a program transmission, a pulse having a predetermined width is transmitted on the same channel as the program which has just terminated. This is detected by the pulse detector 62, which applies an output to the relay 60 to cause it to be operated. This closes the contacts 60A, 60B, momentarily shunting current flowing through the resistor 44 to ground. As a result, the solenoid 46 is rendered inoperative and the spring 50 withdraws the armature 48 from contact with the gear 34. The gear is thus enabled to return to whatever position the wheel 28 had assumed at the time of the selection of the program transmission channel. The switch 26 is now rendered inoperative. As a result, the apparatus is now in position for a new program selection.

In the event a subscriber attempts to turn away from a channel which he has selected and the program for which he has paid to another channel, assuming the program he is viewing is nearing an end, he must turn the selector arm 28 past one of the terminals 20C, 20E, 20D, to which voltage is applied from the rectifier and filter 22. As a result, the pulse detector 62 will detect a pulse and will cause the relay 60 to be operated, as a result of which the coin-pricing apparatus is reset and the subscriber will find that, in order to view the program on the channel which he has now selected, he will have to pay the price associated with that channel. The pulse-detector circuit 62 may comprise any suitable integrating network which provides an output when a voltage is applied to its input over a predetermined interval.

Figure 2:
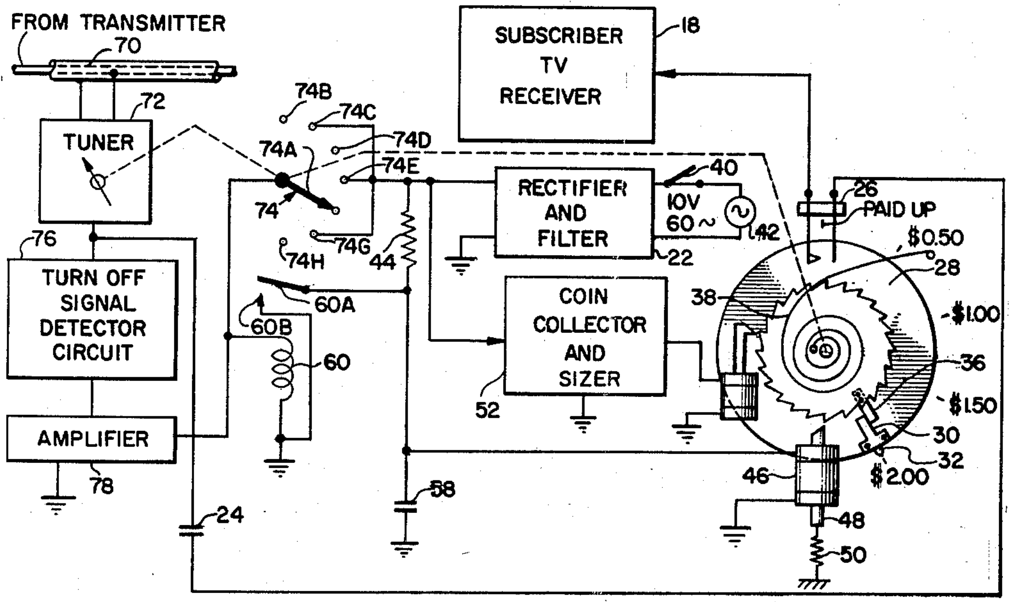
FIGURE 2 is another block diagram of an embodiment of the invention.

Referring now to FIGURE 2, there will be shown an arrangement for the embodiment of the invention where a single line is connected from the transmitter to the subscriber receiver and wherein each transmission channel now is represented by a different carrier signal on which the program has been modulated. Apparatus in FIGURE 2 which functions in similar fashion to the apparatus shown in FIGURE 1 bears the same reference numerals. A coaxial cable may be used which extends from a transmitter to each one of the subscriber receivers. This coaxial cable 70 is connected at each subscriber's receiver to a tuner 72. Output from the tuner is connected through a capacitor 24 and to the normally open switch 26, which, when closed, applies such output to the receiver, to be processed by the circuits of the receiver.

The tuner 72 has its tuning knob ganged with a selector switch 74, having selecting terminals 74B through 74H. The tuner is also ganged with the wheel 28 to cause it to rotate with the tuner as it is turned to tune in a different one of the transmission channels. The selector arm of the switch 74 contacts each one of the selector terminals 74B through 74H as the tuner is rotated to tune in each one of the channels. The coupling with the tuner of the selector switch 74 is arranged so that when switch 40 is closed, whenever the tuner is between channels or is not tuned to a subscription-television channel, one of the terminals, for example, 74C, 74E, or 74G, will be contacted. These terminals are connected to the rectifier and filter 22. Accordingly, between subscription-television channels, the relay 60 is operated in response to the current supplied from the rectifier and filter 22 over the selector switch 74. The relay 60, when operated, renders the solenoid 46 inoperative, whereby the gear 34 can return to whatever position is established by the wheel 28 in response to the position to which the tuner 72 has been turned. This mechanism assures that the subscriber cannot tune from a channel for which he has paid up to another subscription channel, without having to pay the fee called for by this other subscription-television channel.

It is believed that the operation of the system shown in FIGURE 2 for establishing the price of a program to which the tuner 72 is tuned, for paying such price, and for receiving the program as a result, should be thoroughly evident by now, since the pricing apparatus in FIGURE 2 was identical with that shown in FIGURE 1, this time being actuated by a tuner instead of by a selection switch. At the end of the subscription-television program, a turnoff pulse, or any other turnoff signal desired, may be transmitted. This turnoff signal may be detected by any suitable turnoff-signal-detecting circuit 76, such as an integrating network, or a tone-signal detector, and thereafter applied to an amplifier 78, to be amplified. The output of the amplifier 78 is also connected to the relay 60. The relay 60 is operated, whereby the pricing apparatus is reset and the subscriber's television receiver can no longer reproduce a program before payment of the coin demand has been made.

The pricing apparatus described above is simpler and more inexpensive than those available for pricing subscription-television programs heretofore. The use of a plurality of lines is much cheaper than the cost entailed in expensive pricing apparatus available heretofore. It should be remembered that once the lines are installed, the cost thereof is terminated. However, as subscribers are added to an already installed line, the cost of expensive pricing apparatus recurs again and again. Although mechanical connections from the transmission-channel-selecting apparatus and the pricing apparatus is indicated, this is by way of exemplification. Any electromagnetic coupling or other suitable arrangements known in the art may be employed, without departing from the scope of this invention. Further, although the price-establishing apparatus is shown by a gear and wheel coupled to be driven from the channel-selecting shaft, this is by way of illustration and not to be construed as a limitation on the invention, since those skilled in the art, using the teachings herein, can substitute other arrangements, either mechanical or electromechanical, for performing the functions of the wheel and gear without departing from the spirit of the invention or the scope of the claims.

I claim:

1. A pricing arrangement for a subscription-television system comprising a television transmitter, a subscription-television receiver, a plurality of television program transmission channels extending between said television transmitter and subscription-television receiver, means at said subscription-television receiver for selecting one of said plurality of television program transmission channels, and means operative solely in response to operation of said means for selecting and for establishing the cost for viewing said program in accordance with the one of said transmission channels selected by said means for selecting.

2. In a subscription-television system of the type wherein a transmitter transmits television program material to a subscriber receiver over a plurality of separate television channels, the improvement comprising at each receiver means for selecting a desired one of said plurality of separate channels, means for establishing a coin demand for viewing the program on said selected channel responsive solely to operation of said means for selecting said selected channel, means for satisfying said coin demand, and means responsive to satisfaction of said coin demand for enabling viewing of said program material by said subscriber's television receiver.

3. In a subscription-television system of the type wherein a program may be transmitted over one of a plurality of separate television channels to subscriber receivers, the improvement comprising means at each of said subscriber receivers for selecting the one of said plurality of channels over which said program is transmitted, pricing means actuated solely responsive to operation of said means for selecting for indicating a price for viewing said program in accordance with the channel selected, means for receiving payment of the indicated price, means responsive to said means for receiving payment of the indicated price for enabling said subscriber receiver to receive said program, and means actuatable at the termination of a program for disenabling said means for enabling said subscriber receiver to receive said program.

4. In a subscription-television system of the type wherein a subscription-television program is transmitted over one of a plurality of transmission channels, variable means for selecting one of said plurality of transmission channels, pricing means operably coupled to said variable selecting means for establishing a price solely responsive to said varaible selecting means in accordance with the transmission channel selected by said variable selecting means, means for preventing said subscriber television receiver from reproducing the program on a selected channel until said price has been paid, means for receiving payment of said price, means operated responsive to payment of said price for rendering inoperative said means for preventing said receiver from receiving the program on said selected channel, and means for rendering operative said means for preventing said receiver from receiving the program on said selected channel responsive to operation of said selecting means away from said selected channel.

5. The system recited in claim 4 wherein said variable means for selecting a channel comprises a selector switch having a selecting arm and a plurality of terminals to which said selecting arm is connected in sequence, each of said transmission channels being connected to every other one of said terminals, said means for establishing a price responsive to operation of said selecting means comprises a movable means connected to said selector arm to be movable therewith, said movable means indicating a different price at each of the positions to which it is moved when said variable means selects a different one of said plurality of transmission channels.

6. The system as recited in claim 5 wherein said means for preventing said subscriber-television receiver from reproducing the program on a selected channel until said price has been paid comprises a normally open switch connected between said variable means and said subscriber-receiver input, said switch being positioned in the path of said movable means representing a paid-up location, said movable means including means for closing said switch upon being moved to said paid-up location.

7. In a subscription-television system of the type wherein a plurality of television-program-transmission channels are provided each having a different price associated therewith, a receiver having means for selecting for reception a desired one of said transmission channels, pricing apparatus including first means movable between a maximum price position and a paid-up position, means coupling said first means to said means for selecting for moving said first means responsive to operation of said means for selecting to a position representative of the price associated with the transmission channel selected by said means for selecting, second means movable between a maximum price position and a paid-up position, and means for engaging said second means with said first means to be movable therewith, coin-collecting means including means for moving said second means out of engagement with said first means a distance representative of the value of a coin depoisted in said coin-collecting means in the direction of said paid-up position, means rendered operable by said second means attaining said paid-up position for enabling said receiver to reproduce a program on the selected channel, and means operable at the termination of a program for returning said second means to the location of said first means and in engagement therewith.

8. In a subscription-television system as recited in claim 7 wherein said means for selecting includes means for operating said means for returning said second means to the location of said first means and in engagement therewith responsive to said means for selecting being operated from the selection of one to the selection of the other of said transmission channels.

References Cited by the Examiner

UNITED STATES PATENTS

| | | | |
|---|---|---|---|
| 2,843,655 | 7/58 | Gottfried | 178—5.1 |
| 2,966,980 | 1/61 | Nyberg | 194—1 |
| 3,021,383 | 2/62 | Mountjoy | 178—5.1 |

DAVID G. REDINBAUGH, *Primary Examiner.*

STEPHEN W. CAPELLI, *Examiner.*